United States Patent [19]

Cranston

[11] Patent Number: 5,022,609
[45] Date of Patent: Jun. 11, 1991

[54] LANDING GEAR

[75] Inventor: Robert J. Cranston, La Crescenta, Calif.

[73] Assignee: Lockheed Corporation, Calabasas, Calif.

[21] Appl. No.: 463,072

[22] Filed: Jan. 10, 1990

[51] Int. Cl.$^5$ .............................................. B64C 25/26
[52] U.S. Cl. ........................... 244/102 R; 244/102 SL
[58] Field of Search ......... 244/102 R, 102 SS, 102 SL

[56] References Cited

U.S. PATENT DOCUMENTS

| | | | |
|---|---|---|---|
| 2,661,171 | 11/1951 | Allen | 244/102 |
| 2,826,381 | 3/1958 | Cruz | 244/102 SL |
| 2,869,806 | 1/1959 | Beach | 244/102 |
| 2,963,246 | 12/1960 | Mitrovich | 244/102 |
| 2,967,033 | 1/1961 | Langdon | 244/102 R |
| 3,121,547 | 2/1962 | Paxhia et al. | 244/102 |
| 3,198,461 | 8/1965 | Beach | 244/102 |
| 4,328,939 | 5/1982 | Davies et al. | 244/102 |

FOREIGN PATENT DOCUMENTS

| | | | |
|---|---|---|---|
| 1090016 | 3/1955 | France | 244/102 SL |
| 115110 | 10/1945 | Sweden | 244/102 SL |
| 613430 | 11/1948 | United Kingdom | 244/102 SL |
| 1333200 | 10/1973 | United Kingdom | 244/102 SL |

*Primary Examiner*—Galen Barefoot
*Attorney, Agent, or Firm*—Louis L. Dachs

[57] ABSTRACT

The invention is a retractable landing gear for an aircraft. In detail, the landing gear includes a main strut having a first end pivotally attached to the airframe and a second end having a wheel assembly attached thereto. The main strut is rotatable about a pivot axis through an angle defined by the extended and retracted positions. a drag strut is pivotally attached by its first end to the airframe and by its second end to the main strut. The drag strut includes upper and lower strut members pivotally attached together at an intermediate point, with the intermediate point located angularly from the pivot axis of the main strut at an angle that is one half the angle rotated by the main strut from the extended position to the retracted position. An overcenter downlock and uplock linkage is provided for locking the main strut in either the extended or retracted position. The linkage includes a first link having a first end pivotally attached to the airframe with an axis of rotation coincident with the rotational axis of said main strut. A second link is pivotally attached by its first end to the drag strut at the intermediate point and pivotally attached at its second end to the second end of the first link. Additionally, a mechanism to actuate the downlock and uplock linkage prior to rotation of the main strut and a mechanism to rotate the main strut back and forth from the extended and retracted positions are provided.

8 Claims, 3 Drawing Sheets

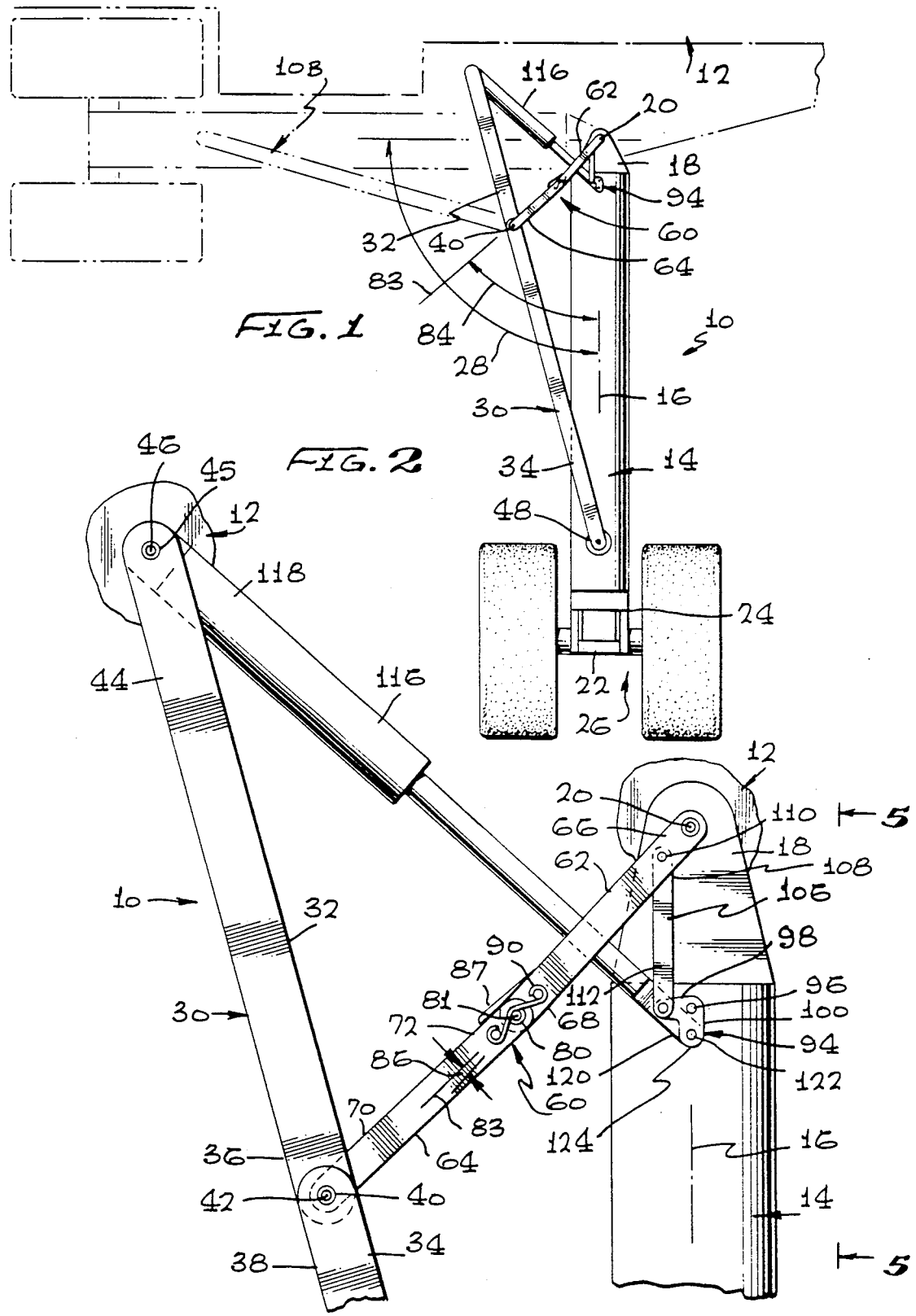

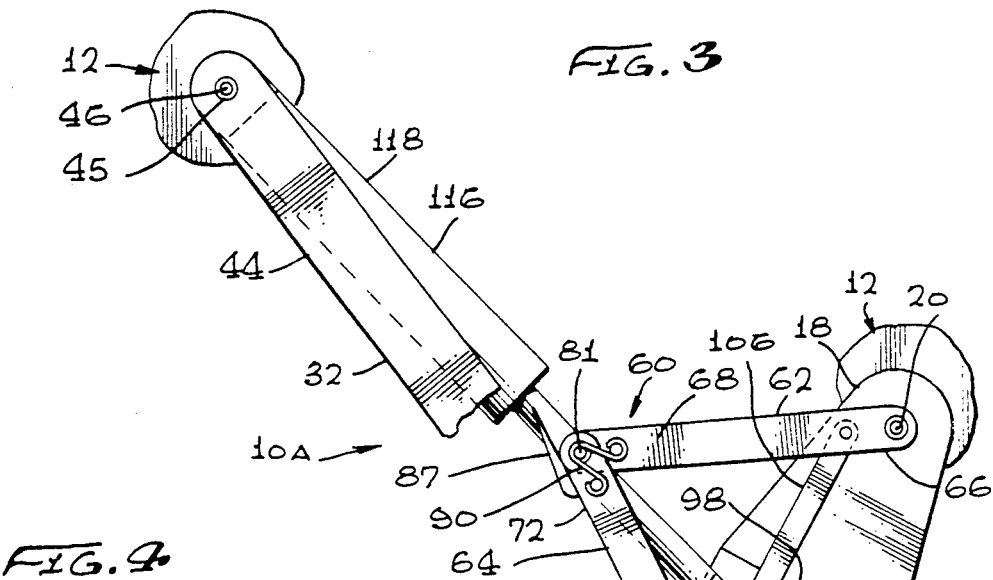
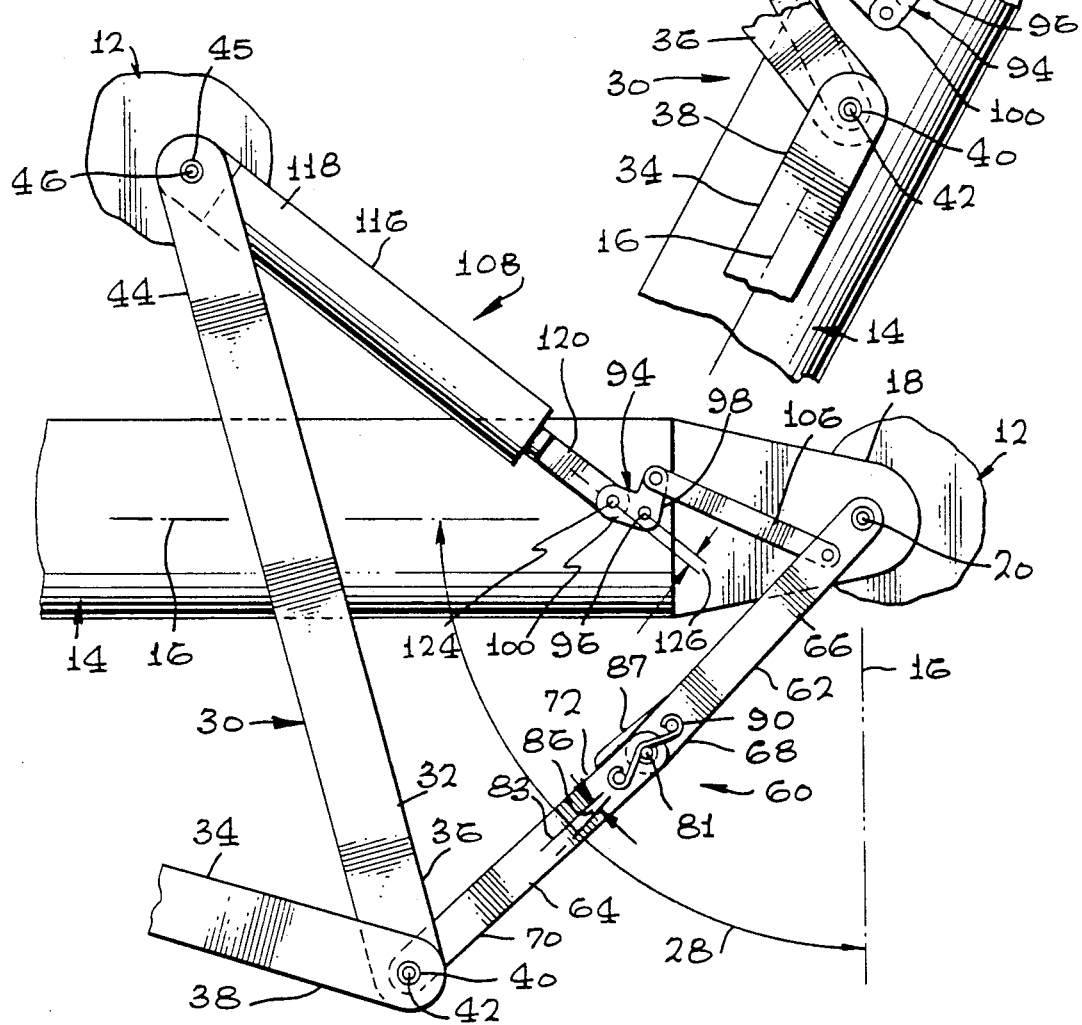

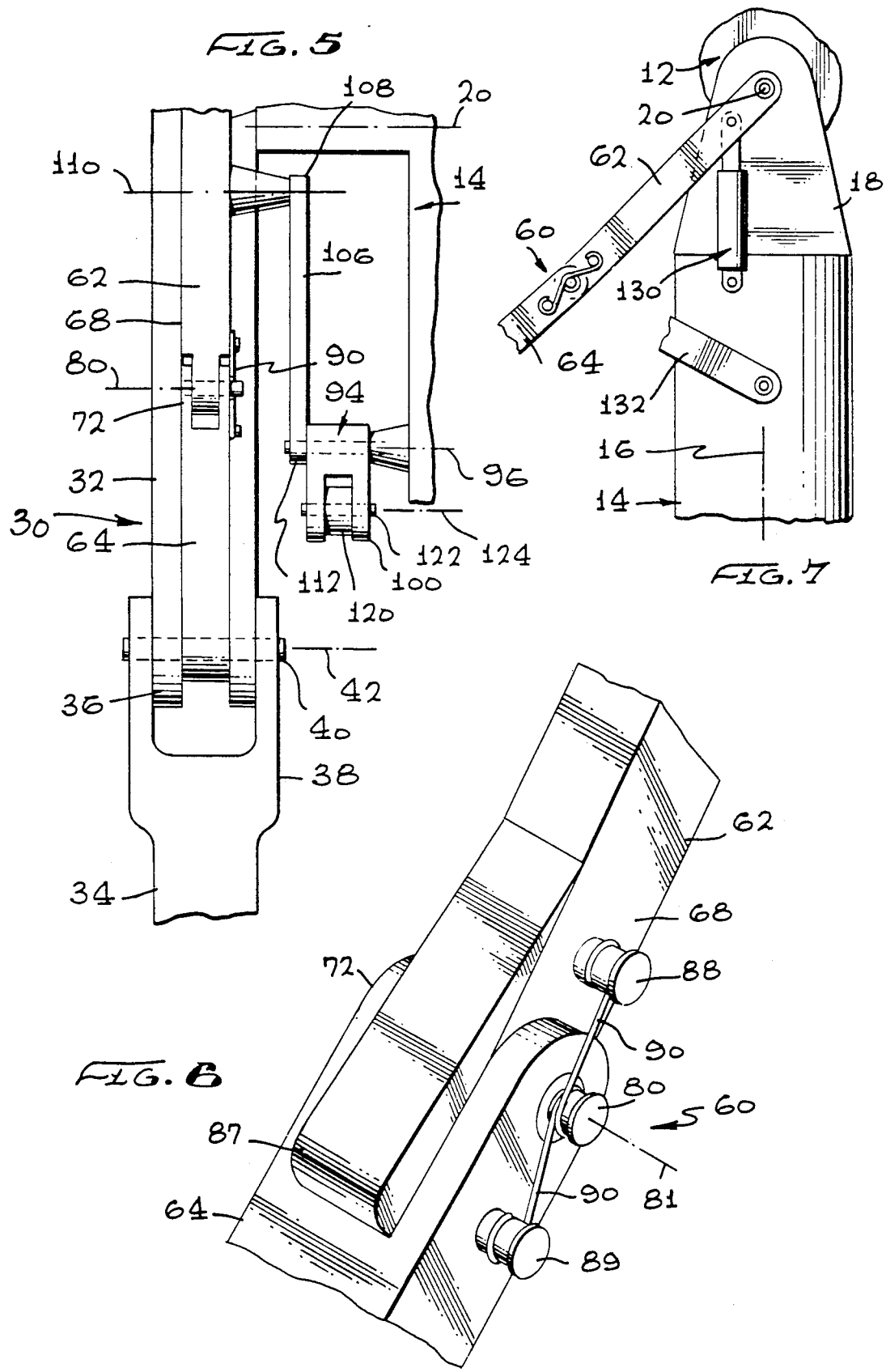

LANDING GEAR

The U.S. Government has a paid up license in the and the right, in limited circumstances, to require the patent owner to license others on reasonable terms as provided for in a U.S. Government contract awarded by the United States Air Force.

BACKGROUND OF THE INVENTION

1. Field of the Invention

The invention pertains to landing gear for aircraft and, in particular, to landing gear having a combined downlock and uplock linkage that returns to the same position when cycled from the extended position to the retracted position.

2. Description of Related Art

All retractable landing gear for aircraft generally include: (1) a main strut rotatably mounted at one end to the airframe and at the opposite end to a wheel/tire and shock absorber assembly; (2) a collapsible side brace mounted between the airframe and main strut; (3) a downlock mechanism to insure that the landing gear cannot inadvertently collapse or retract after extension; (4) actuation means to extend and retract the landing gear; and (5) an uplock mechanism to secure the landing gear in the retracted position.

For example, U.S. Pat. No. 2,661,171 "Up and Down Lock Mechanism for Retractable Landing Gear for Aircraft" by J. Allen discloses a nose landing gear having a main strut, drag strut and separate uplock and downlock mechanisms. This design is of interest in that the actuator used to raise and lower the main strut is also used to actuate the downlock and uplock mechanisms in proper sequence. However, a separate downlock and uplock mechanism is required. Another example is the main landing gear used on the Lockheed Aircraft Corporation L-1011 Aircraft. Here, the landing gear is more conventional, in that a separate hydraulic cylinder is used to actuate the downlock mechanism and the uplock mechanism is integral with the landing gear door actuation system.

In U.S. Pat. No. 4,328,939 "Airplane Main Landing Gear Assembly" by J. Davies et al., the landing gear includes, in addition to the main strut and drag strut, a foldable side strut. Both the drag strut and side strut include over center downlock mechanisms operated by separate hydraulic cylinders. U.S. Pat. No. 2,963,246 "Retractable Landing Gear for Aircraft" by M. Mitrovich and U.S. Pat. No. 3,121,547 "Landing Gear" by E. Paxhia et al. both disclose landing gear designs which are adapted to be mounted to the fuselage and are stored therein when retracted in a front to rear position, and are moved down and outward when extended. U.S. Pat. No. 2,869,806 "Aircraft Landing Gear" by J. Beach discloses a main landing gear that is moved upward and rotated forward by a parallelogram linkage when retracted, such that the wheels remain aligned to the fuselage. U.S. Pat. No. 3,198,461 "Retractable Landing Gear" by J. Beach discloses a main landing gear wherein the right and left gears are coupled together by a parallelogram linkage that upon retraction, rotates both sides forward toward each other and upward into the fuselage for storage. All of these latter patents are of general interest only in that none disclose a retractable landing gear either nose or main, which includes a combined downlock uplock mechanism which returns to the same position when cycled from the retracted position to the extended position and visa-versa.

Thus, it is a primary object of the subject invention to provide a retractable landing gear.

It is another primary object of the subject invention to provide a retractable landing gear having a combined uplock and downlock mechanism.

It is a further object of the subject invention to provide a retractable landing gear having a combined downlock and uplock mechanism, which returns to the same position when the gear is cycled from the extended position to the retracted position and visa-versa.

It is a still further object of the subject invention to provide a landing gear having a combined downlock and uplock mechanism which returns to the same position when cycled from the extended position to the retracted position and visa-versa and which uses a single actuator to accomplish unlocking of the downlock and uplock mechanism and rotation of the landing gear.

SUMMARY OF THE INVENTION

The invention is a retractable landing gear for an aircraft which can be used for either the main gear or the nose gear. In detail, the invention comprises a main strut having an upper end pivotally attached to the aircraft and a lower end attached to a wheel assembly. The main strut is rotatable about a pivot access through a given angle defined by the extended and retracted positions. Also included is a drag strut having first and second ends, the first end pivotally attached to the aircraft at an offset distance from the main strut and a second end pivotally attached to the main strut. The drag strut is composed of upper and lower strut members, pivotally attached together at an immediate point along the drag strut. This intermediate point is defined angularly from the pivot axis of the main strut at an angle equal to one half the total angular rotation of the main strut from the retracted position to the extended position. Thus, for example, if the main strut rotates through a 90 angle, the intermediate point would be defined by a 45 angle.

An over center downlock and uplock linkage for locking the main strut in either the extended or retracted positions is included. In detail, the downlock and uplock linkage comprises a first link having first and second ends with the first end pivotally attached to the main strut with an axis of rotational coincident with the rotational axis of the main strut. A second link is pivotally attached to the drag strut by its first end and by its second end to the second end of the first link. A spring is attached to the downlock and uplock linkage biasing the linkage to the "locked position" and a stop member is attached to the second link to limit the over center position. Also included are means to rotate the main strut and means to actuate the overcenter downlock and uplock linkage from a "locked position" to an "unlocked position", prior to rotation of the main strut.

Preferably these two means are coupled together in the following manner. A bell crank, having first and second ends, is pivotally attached at its center to the main strut. A main actuator is pivotally attached to the airframe and also to the second leg of the bell crank. A third link has a first end pivotally coupled to the first link of the bell crank and a second end pivotally attached to the downlock and uplock linkage, preferably to the first link at an intermediate point between its ends. The location of the bell crank, main actuator and third link and their lengths, etc. are such that the main actuator will always apply a force tending to initially rotate the bell crank, such that the third link can move the downlock and uplock linkage to the "unlocked position" prior to the actuator causing rotation of the main strut.

Thus, initial movement of the actuator will cause the bell crank to rotate, in turn, causing the third link to move the downlock and uplock linkage from its "locked position" and subsequent movement causes the main strut to rotate. Upon full rotation of the main strut from the extended position to the retracted position or visa-versa the uplock and downlock linkage returns to the same overcenter position.

Alternately, a second actuator can be coupled between the main strut and first link and the main actuator can be coupled directly to the main strut. However, control means must be provided to insure proper sequencing of the second actuator such that the downlock and uplock linkage is always moved to an "unlocked position" prior to rotation of the main strut.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1, is a forward view of a semi-schematic representation of the landing gear in the extended position and retracted position (shown in dotted lines).

Illustrated in FIG. 2, is an enlarged partial view of FIG. 1 particularly showing the overcenter downlock and uplock linkage with the landing gear in the extended position.

Illustrated in FIG. 3, is a view similar to FIG. 2 with the landing gear in the partially retracted position.

Illustrated in FIG. 4, is a view similar to FIG. 2 with the landing gear in the retracted position.

Illustrated in FIG. 5, is a partial side view of the landing gear shown in FIG. 2 taken along the line 5—5.

Illustrated in FIG. 6, is an enlarged partial perspective view of the downlock and uplock linkage shown in FIG. 2.

Illustrated in FIG. 7, is a partial side view of the landing gear shown in FIG. 2, illustrating an alternate embodiment for actuating both the downlock and uplock linkage and main strut.

DESCRIPTION OF THE PREFERRED EMBODIMENT

In FIGS. 1-6, the landing gear is illustrated in a semi-schematic form, since the size and shape of individual components and methods of attachment and other details will vary from aircraft to aircraft. However, it should be readily apparent to those skilled in the art of landing gear design that such details are unnecessary for complete understanding of the invention. Further, while the embodiments discussed all relate to main landing, the invention is also applicable to nose landing gear.

Referring particularly to FIGS. 1, 2, 5 and 6, it can be seen that the landing gear 10 is mounted to the airframe, generally indicated by numeral 12, and includes a main strut 14 having a longitudinal axis 16, an upper end 18 pivotally mounted to the airframe 12 with an axis of rotation indicated by numeral 20. The second end 22 of the main strut 14 incorporates an integral shock absorber 24 having a wheel assembly 26 attached thereto. The total angle of rotation, indicated by numeral 28, of the main strut 14 from the extended position to the retracted position may vary, as dictated by the design of the aircraft. However, as illustrated in FIG. 1 the angle 28 is 90°.

The main landing gear 10 further includes a foldable side brace 30 composed of upper and lower brace members 32 and 34, respectively. The upper and lower brace members 32 and 34 are pivotally coupled together at their ends 36 and 38, respectively, by means of a pin 40, providing a rotational axis 42 for the two members at an intermediate point along the brace 30. Note that both ends 36 and 38 of the upper and lower brace members end in clevises (best seen in FIG. 5). The brace 30 is pivotally attached to the airframe 12 at end 44 of its upper brace member 32 by means of a pin 45, providing a rotational axis indicated by numeral 46. The brace 30 is pivotally attached at end 48 of its lower brace member 34 to the main strut 14 between its ends 18 and 22 (best seen in FIG. 1).

A combined overcenter downlock and uplock linkage, generally indicated by numeral 60, is used to lock the upper and lower side brace members 32 and 34 in the in-line relationship so that the main strut 14 cannot retract. The linkage 60 includes first and second links 62 and 64, respectively. The first link 62 is rotatably attached by its first end 66 to the main strut 14, having an axis of rotation coincident with the axis of rotation 20 of the main strut 14, and a second end 68 in the form of a lug. The second link 64 is pivotally coupled at its first end 70 to the pin 40 and at its second end 72, in the form of a clevis, to the second end 68 (lug) of the first link 62 by means of a pin 80. Thus, the links 62 and 64 have a common axis of rotation 81 at their second ends (best seen in FIG. 6).

In order to achieve the return of the downlock and uplock linkage 60 to the "locked position", after the landing gear is cycled to the retracted position shown the angular relationship of the axis of rotation 40 of the second ends 36 and 38 of the upper and lower brace members 32 and 34 to the axis of rotation 20 of the main strut (indicated by line 83) must be one half of the angle 28 i.e., the total rotational angle of the main strut from the extended position to the retracted position, indicated by numeral 84. Thus, as illustrated, the angle 28 is 90°, and thus, the angle 84 is 45°degrees. However, in order to insure that the landing gear remains in either the extended position or the retracted position, the downlock and uplock linkage 60 is designed to have an overcenter position when the landing gear is in either of these positions. The overcenter distance, as indicated by numeral 86, is the distance from the axis of rotation 81 of the links 62 and 64 about the pin 80 to the line 83 (best seen in FIG. 2). The movement of the link 62 and 64 to this position is limited by a mechanical stop member 87 mounted to end 72 of the link 64 which contacts end 68 of the links 62. The link 62 and 64 incorporate "T" shaped lugs 88 and 89, respectively. A spring 90 (best seen in FIG. 6) has its ends wound about the lugs 88 and 89 and its center wound about pin 80, and thus, biases the linkage 60 to the over center "locked position". Thus, it can be readily seen that the drag strut 30 prevents the main strut 14 from rotating and the downlock and uplock linkage 60 prevents the brace from folding.

Also included is a bell crank 94 which is pivotally mounted to the main strut 14, at its center 96 along the longitudinal axis 16, and thus, is rotational thereabout. The bell crank has a first leg 98 and a second leg 100, the second leg 100 being in the form of a clevis. A link 106 is pivotally attached by its first end 108 at an intermediate point 110 on the link 62 and at its second end 112 to first leg 98 of the bell crank 94. A main actuator 116, preferably hydraulically powered, is pivotally mounted at its first end 118 to the airframe 12 and preferably having an axis of rotation coincident with the axis of rotation 46, and at its second end 120, in the form of a lug, to the second leg 100 of the bell crank 94 by means of a pin 122, thus, having an axis of rotation 124.

Now referring to FIGS. 1-6, it can be seen that initial actuation (retraction) of the main actuator 116 causes the bell crank 94 to rotate clockwise about its center 96 causing first leg 98 to move link 106 upward. This, in turn, causes the first link 62 to rotate clockwise about the axis of rotation 20 "braking" the downlock uplock linkage 60 from the "locked position". Further retraction of the main actuator 116 then causes the landing gear to move to an intermediate position indicated by numeral 10A, shown in FIG. 4. In this position the lower brace 34 becomes aligned with the longitudinal axis 16 of the main strut 14, upper brace 32 is rotated counterclockwise and the links 62 and 64 fold inward and upward toward each other. Continued rotation of the landing gear to the retracted position indicated by numeral 10B, shown in FIG. 4, causes the upper brace member 32 to be rotated counterclockwise back to its original position; however, the lower brace member 34 continues to rotate clockwise to the position indicated in FIG. 4. Of course, the link 62 and 64 return to their original position. The link 106 has now rotated clockwise about the intermediate point 110 on the link 62. Also note that in the retracted position the main actuator 116 is coupled to the bell crank 94 such that the axis of rotation 124 is offset by a distance 126 from the axis of rotation 96 of the bell crank 94 and the second end 112 of the link 106 is pivotally coupled to the first leg 98 of the bell crank 94 on the opposite side of the axis of rotation 96. Thus, when the main actuator 116 now is actuated (extended) it first rotates the bell crank 94 counterclockwise causing the link 106 to again "brake" the downlock and uplock linkage 60 and additional extension of the main actuator 116 then causes the landing gear to return to the extended position.

While the single main actuator 116 is used to actuate the downlock and uplock linkage as well as rotate the main strut 14, by use of the bell crank 94 and link 106, it is not an absolute necessity. Illustrated in FIG. 7, is an alternate embodiment wherein a second actuator 130 is coupled between the main strut 14 and link 62, eliminating the bell crank 94 and link 106. A main actuator 132 in this instance is pivotally coupled directly to the main strut 14, however, a controller (not shown) will be necessary to insure that the actuator 130 is actuated prior to the main actuator 132 during the retraction and extension cycles.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft industry and, in particular, to aircraft requiring retractable landing gear.

I claim:

1. A retractable landing gear for an aircraft comprising:
    a main strut having a first end pivotally attached to the aircraft and a second end having a wheel assembly attached thereto, said main strut rotatable about a pivot axis through an angle defined by the extended and retracted positions; a drag strut having first and second ends, said first end pivotally attached to the aircraft and said second end pivotally attached to the main strut, said drag strut including upper and lower strut members pivotally attached together at an intermediate point, said intermediate point located angularly from the pivot axis of the main strut at an angle that is one half the angle rotated by the main strut from the extended position to the retracted position;
    an over center uplock and downlock linkage for locking said main strut in either the extended or retracted position comprising:
        a first link having first and second ends, said first end pivotally attached to the aircraft, having an axis of rotation coincident with said rotational axis of said main strut; and
        a second link having first and second ends, said first end pivotally attached to said drag strut at said intermediate point and pivotally attached at said second end to said second end of said first link; and
        means to actuate said over center downlock and uplock linkage prior to rotation of said main strut; and
        means to rotate said main strut back and forth from said extended and retracted positions.

2. The landing gear as set forth in claim 1, wherein said means to rotate said landing gear from said extended position to said retracted position comprises an actuator having first and second ends, said first end coupled to said aircraft and said second end coupled to said main 3. The landing gear as set forth in claim 2 further comprising:
    said means to actuate said over center downlock and uplock linkage further includes a bell crank pivotally attached to said main strut, said bell crank having first and second legs;
    said second end of said actuator pivotally attached to said second end of said bell crank; and
    a third link having first and second ends, said first end pivotally attached to said first leg of said bell crank and said second end pivotally attached to said downlock and uplock linkage.

4. The landing gear as set forth in claim 3, wherein:
    said means to actuate said over center downlock and uplock linkage further includes said bell crank pivotally mounted to said main strut; and
    said second end of said third link coupled to said downlock and uplock linkage, such that said actuator moves said linkage to an unlocked position prior to rotation of said main strut.

5. The landing gear as set forth in claim 4, wherein said second end of said third link is pivotally attached to said first link.

6. The landing gear as set forth in claim 5, wherein said downlock and uplock linkage further includes means to limit the over center position thereof.

7. The landing gear as set forth in claim 6, wherein said downlock and uplock linkage further includes biasing means for urging said linkage to said over center position.

8. The landing gear as set forth in claim 7, wherein said biasing means is a spring.

* * * * *